Patented Jan. 1, 1924.

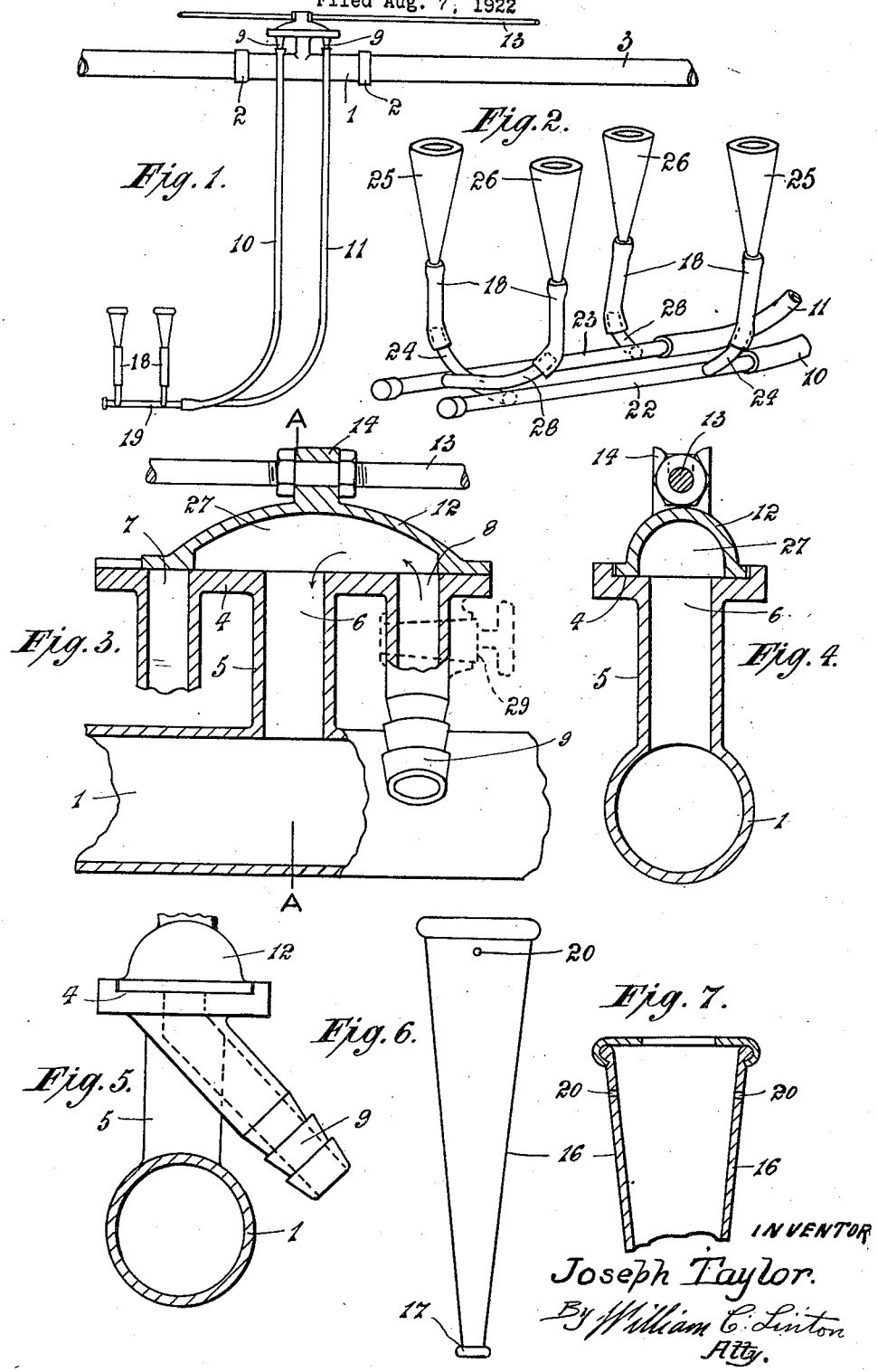

1,479,336

UNITED STATES PATENT OFFICE.

JOSEPH TAYLOR, OF ELTHAM, TARANAKI, NEW ZEALAND.

MILKING MACHINE.

Application filed August 7, 1922. Serial No. 580,271.

*To all whom it may concern:*

Be it known that I, JOSEPH TAYLOR, a subject of the King of Great Britain and Ireland, residing in Eltham, in the Provincial District of Taranaki, in the Dominion of New Zealand, have invented a new and useful Improvement in Milking Machines; and I do hereby declare the following to be a full, clear, and exact description of the same.

This invention relates to vacuum milking machines and the object of the invention is to provide a machine which will obviate the use of rubber inflations and which will be efficient, clean and simple in construction.

According to the present invention, means are provided whereby the interior of the teat cups are intermittently and alternately opened to vacuum and to the air. This is accomplished by means of a vacuum control device which intermittently and alternately opens the interior of the teat cups to vacuum. This vacuum control device is constructed in such a manner that it will intermittently open the milk pipe leading from the part of the milk claw connecting one pair of cups to the main milk vacuum pipe so that such cups are intermittently cut off from vacuum while such vacuum control device will alternately and intermittently open the milk pipe leading to the part of the claw connected with the other pair of teat cups so that when one pair of teat cups is in vacuum the other pair has vacuum cut off therefrom.
The vacuum control device will not admit air to the cups, the air being admitted from the cups or from any convenient portion of the claw or milk pipes attached to the claw.

An approved form of the invention is illustrated in the accompanying drawings, wherein:—

Figure 1, is an elevation of a milking machine assembled.

Figure 2, is a perspective view of a milk claw with teat cups attached.

Figure 3, is a sectional view through a vacuum control device.

Figure 4, is a cross section through line A—A, Figure 3.

Figure 5, is an end view of the vacuum control device.

Figure 6, is an elevation of a teat cup.

Figure 7, is a cross sectional view of the upper portion of the teat cup.

Referring now to the drawings, the vacuum control device consists of a pipe 1 (see Figure 3) having socket ends 2 whereby it may be interposed between sections of the main vacuum milk pipe 3, the pipe 1 being of an internal area in cross section corresponding to the area of the milk pipe 3. A slideway 4 is formed integrally with the pipe 1 above the pipe by means of a neck 5 containing a port 6 leading from the face of the slideway 4 to the interior of the pipe 1. Ports 7 and 8 arranged respectively upon each side of the vacuum port 6 open into the face of the slide-valve and lead through nipples 9 to which the flexible milk pipes 10 and 11 from the claw 19 are attached (see Figure 1). A valve 12 adapted to be reciprocated by a rod 13 which is operated from any convenient moving portion and which enters lugs 14 upon the slide-valve, is secured thereon by nuts. The slide-valve 12 in the position shown in Figure 3, is at one end of its stroke and in that position opens the port 8 to the main vacuum port 6 by the medium of its chamber 27, but closes the other vacuum port 7, and similarly, when such valve is at the other end of its stroke, the port 7 will be in communication with the port 6 and the port 8 will be closed. The teat cups are as illustrated in Figures 6 and 7 and consist of a single casing 16 and taper from the top to the bottom which forms a nipple 17 for the attachment of the flexible pipes 18 leading to the branch pipes and the milk claw 19 (see Figure 2). Orifices 20 in the upper part of the cup admit air to the interior of the cup for the purpose of forming the pulsations and allowing the teat to return to normal which operation will presently be described.

A rubber mouth piece is provided upon the top of the cup in order to fit closely around the base of the teat. The pipes 10 and 11 will be led to pipes 22 and 23 respectively. Branch pipes 24 from the pipe 22 lead to one pair of teat cups referenced 25, while branch pipes 28 lead from the other pipe 23 to the other pair of teat cups referenced 26 (see Figure 2).

The operation of the whole machine will now be described.

The main milk pipe 3 is, as usual in milking machines, in constant vacuum, being exhausted of air by a vacuum pump or other suitable means through a releaser or other vacuum tank. When the valve 12 is in the position shown in Figure 3, air would be exhausted from the pair of teat cups referenced 25 by means of the flexible pipe 11 which is attached to the nipple 9 and a sufficient working vacuum will thereby obtain within this pair of teat cups with the result that the animal's teat will be dilated and milk which is within the pipe 22 of the claw will be drawn through the port 8 into the chamber 27 of the slide-valve and thence into the port 6 and into the main milk pipe 3. When the valve 12 moves to the other end of its stroke the port 8 will be closed and consequently air can no longer be exhausted from the teat cups 25, and air passing into the orifices 20 in the teat cup will break down the vacuum therein, and the teat will be returned to its normal size. This intermittent action of air and vacuum will operate the teat to extract the milk therefrom. At the same time as the valve closes the port 8 it will open the port 7 and the teat cups 26 will now be exhausted of air, and milk in the portion 23 of the claw will be drawn through the pipe 10 through the port 7 into the chamber 27 of the valve and into the milk pipe 3 through the port 6.

When using the system above described it will be noticed that one pair of teat cups has vacuum obtaining therein while the other pair has air obtaining within them, and when the vacuum is broken down within one pair of cups the teat cups forming the pair would be liable to fall off were both cups led to the same side of the claw. In order to overcome this objection I arrange the two cups forming the pair which lead from the pipe 22 diagonally opposite each other, as shown in Figure 2, while the two cups forming the pair of cups 26 attached to the pipe 23 are also arranged diagonally opposite to each other. By this means it will be seen that since the cups forming one pair are diagonally opposite each other they will have vacuum obtaining in them, while the other two cups also diagonally opposite to each other will have air obtaining in them, and thus both sides of the claw will be supported by a cup with vacuum obtaining therein.

What I claim is:—

1. In a milking machine having a main vacuum milk pipe and into which the milk from the teat cups is drawn; single chambered teat cups connected with said main vacuum milk pipe which permits a small quantity of air to enter from the exterior of said cups, said teat cups divided into pairs, means whereby one pair of said cups communicate with said main vacuum milk pipe by one line, the other pair communicating by another line with the main vacuum milk pipe, means interposed between the said lines and the main vacuum milk pipe whereby communication is intermittently and alternately cut off between said main vacuum milk pipe and each line, substantially as described.

2. In a milking machine of the kind having a main vacuum milk pipe into which the milk from the teat cups is drawn through a milk claw; single chambered teat cups which permit air to enter from the exterior of said cups, said cups divided into pairs, two milk passages in said claw, one pair of cups connected to one passage and the other pair of cups connected to the other passage each passage of said milk claw leading to said vacuum milk pipe, a slideway arranged above the said main milk pipe, a vacuum port leading from the face of said slideway to the main milk pipe, a port upon one side of said vacuum port to which one passage of said milk claw is in communication, a port upon the other side of said main vacuum port to which the other passage of said claw is in communication, a slide valve controlling the ports and arranged to open and to cut off alternately said latter ports to the vacuum port but does not open said ports to air, substantially as described.

3. In a milking machine having a main vacuum milk pipe and into which the milk from the teat cups is drawn; single chambered teat cups connected with said main vacuum milk pipe which permit a small quantity of air to enter from the exterior of said cups, said teat cups divided into pairs, means whereby one pair of said cups communicate with said main vacuum milk pipe by one line, the other pair communicate by another line with the main vacuum milk pipe, means interposed between the said lines and the main vacuum milk pipe whereby communication is intermittently and alternately cut off between said main vacuum milk pipe and each line, two cups forming a pair leading to one passage and the other two cups forming a pair being connected to the other passage, the two cups of one pair being arranged diagonally in relation to the two cups of the other pair, substantially as described.

4. In a milking machine of the kind having a main vacuum milk pipe into which the milk from the teat cups is drawn, single chambered cups connected with said main milk pipe, air orifices near the top of said cups to permit air to enter the interior of said cups from the exterior thereof, said teat cups divided into pairs, means whereby one pair of said cups communicate with said main vacuum milk pipe by one line, the other pair communicating by another line with the main vacuum milk pipe, means interposed between the said lines and the main vacuum milk pipe whereby communication is intermittently and alternately cut off between said main vacuum milk pipe and each line, substantially as described.

In testimony whereof, I have signed my name to this specification in the presence of two subscribing witnesses.

JOSEPH TAYLOR.

Witnesses:
MAURICE STRANGE,
ANDREW BOWDEN.